June 30, 1964 K. HERKT 3,138,988
PROJECTOR WITH INDEX MEANS
Filed Jan. 31, 1961 2 Sheets-Sheet 1

INVENTOR
KARL HERKT
BY
*Ernest Hemitague*
ATTORNEY.

June 30, 1964 K. HERKT 3,138,988
PROJECTOR WITH INDEX MEANS
Filed Jan. 31, 1961 2 Sheets-Sheet 2
FIG. 2.
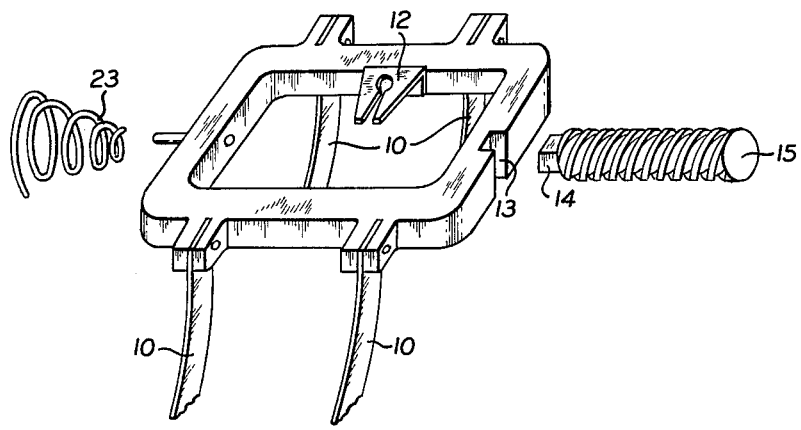
FIG. 5.
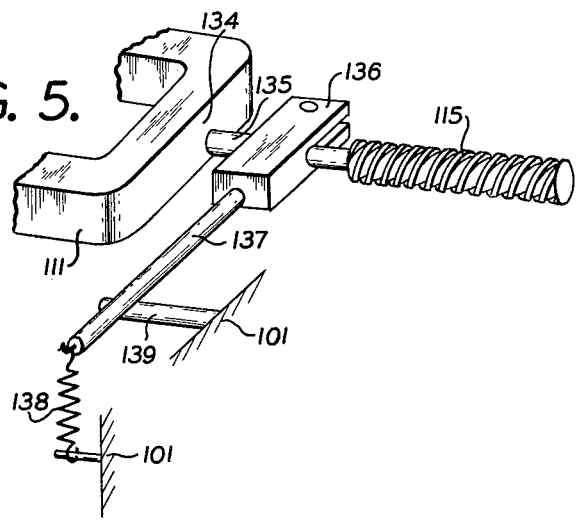
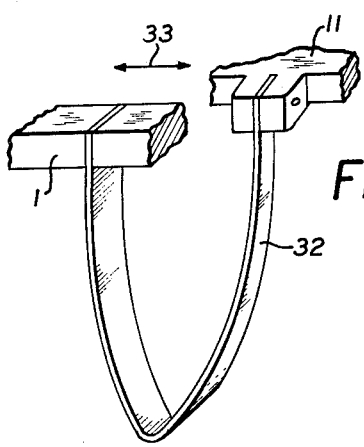
FIG. 4.
INVENTOR
KARL HERKT
BY
ATTORNEY.

United States Patent Office 3,138,988
Patented June 30, 1964

3,138,988
PROJECTOR WITH INDEX MEANS
Karl Herkt, Traunreut uber Traunstein, Germany, assignor to Fa. Wenczler & Heidenhain, Traunreut, near Traunstein, Germany, a corporation of Germany
Filed Jan. 31, 1961, Ser. No. 86,183
5 Claims. (Cl. 88—24)

The present invention relates to a projector, in general, and to a projector with a mark adjustable along the image plane of the projection ray path, the adjustability being measurable, in order to determine the position of a predetermined image point in the image plane, in particular.

Such devices are used, for instance, for the fine reading of coarsely divided measuring rods, wherein the position of an image of a scale line of the coarse division is measured in the image plane.

In order to guide mechanically the adjustable mark, the carrier of this mark has been mounted until now in possibly precisely worked slide guides. Such arrangement has, however, the decisive drawback that a freedom from play and an easy motion of the guide cannot be obtained simultaneously, though the manufacture of such slide guide is comparatively expensive already. It is also a further drawback of such structures that the guide requires continuous attendance, in order not to lose its good characteristics either temporarily or even permanently.

It is, therefore, one object of the present invention to provide a projector wherein the mentioned drawbacks of the known devices are avoided.

It is another object of the present invention to provide a projector which includes spring blade arms disposed parallel to each other for the purpose of carrying and simultaneously guiding of the adjustable mark.

It is yet another object of the present invention to provide a projector which overcomes the prejudice which was experienced until now in the application of such resilient carrying and guiding arms at the mentioned point of said devices. Apparently, the opinion prevails so far that rigid slide paths could not be dispensed with on these devices for the straight guiding of the adjustable mark. It has been found, however, in a surprising manner, that the guide of the mark suffices in the manner of the present invention, first of all, when the mark is disposed in the enlarging projection ray path in or close to the image plane. Then the projection objective operates as a kind of shadow projection simultaneously as projection centrum for the image of the mark into the image plane, if these two cannot coincide from the start exactly already.

It is still a further object of the present invention to provide a projector wherein the simple structure of the device is still enhanced by the particularly simple adjustment drive for the mark. This adjustment drive comprises, in accordance with the present invention, a threaded spindle which engages by pressure locking means the carrier for the mark guided by the spring blade arms in the direction of adjustment, and is also in non-rotatable connection therewith and receives an axially secured, rotatable nut, the changeable rotary position of which serves as a measure for the adjustment of the mark.

By means of such arrangement of the device, a very convenient reading possibility for the rotary position of the nut may be obtained in such manner, that a series of numbers annularly disposed on a transparent disc concentrically connected with the nut passes an additional projection objective, which projects one number of the series in the image plane of the first-mentioned projection ray path.

It is also a further object of the present invention to provide a projector wherein the guiding characteristics of the spring blade arms are still further improved by joining at least two spring blade arms disposed in a plane perpendicularly to the adjustment direction by means of cross connection elements to a single unit which is bendable, however, torque resistant.

It is still a further object of the present invention to provide a projector wherein the guiding characteristics are still further improved, particularly in relation to the straightness by forming the spring blade arms of U or V-shape and particularly in such manner that one end of the spring blade arms is connected with the carrier of the mark and the other end of the spring blade arms is secured to the housing of the projector and both ends of the spring blade arms are disposed in a common plane which is parallel to the direction of adjustment.

With these and other objects in view, which will become apparent in the following detailed description, the present invention will be clearly understood in connection with the accompanying drawings, in which:

FIG. 2 is a fragmentary perspective view of the drive means for the adjustment of the mark;

FIG. 4 is a perspective view of another embodiment of the spring suspension for the mark carrier; and FIG. 5 is a schematic perspective view of another embodiment of parts of the adjustment drive.

Figure 1:
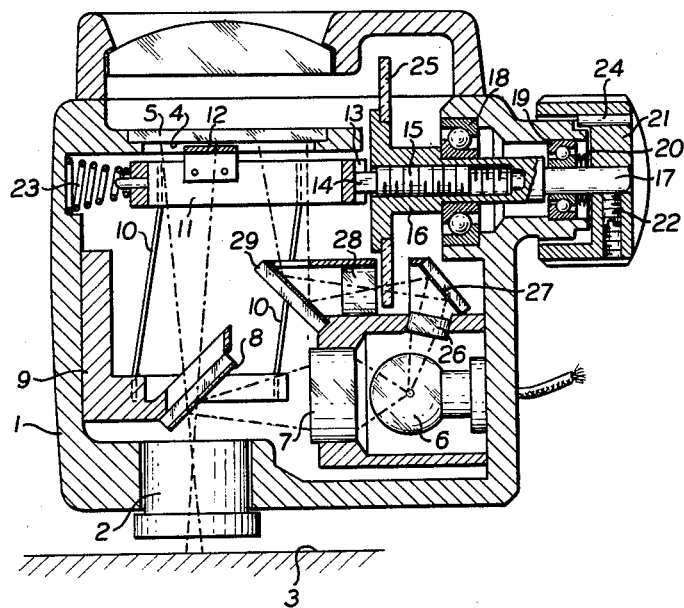
FIGURE 1 is a vertical section of the projector.
Figure 3:
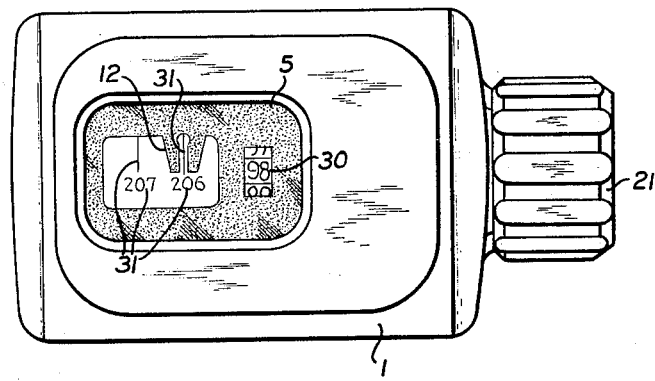
FIG. 3 is a top plan view of the projector indicating simultaneously the picture plane.

Referring now to the drawings, and in particular to FIGS. 1 to 3, the projector comprises a housing 1, the lower portion of which carries an objective 2, which projects an object 3, for instance, the division of a measuring rod, into an image plane 4.

The latter comprises in known manner the dulled underside of a glass plate 5. The object 3 is illuminated from above by a lamp 6 disposed in the housing 1 over a condenser 7, a semi-transparent mirror 8 and the objective 2.

The following arrangement is made for the determination of the position of a predetermined image point in the image plane 4:

Four spring blade arms 10 (FIGS. 1 and 2) project substantially vertically upwardly close to a point below the glass plate 5 from an angular support 9 secured to the housing 1. A frame 11 is secured to the upper end of the spring blade arms 10, on which frame 11 is secured a mark 12 which is fork-shaped. Due to the support of the frame 11 by the spring blade arms 10, the frame 11 is guided for substantially horizontal adjustability and, thereby, also the mark 12. The rigid cross-connection of the spring blade arms 10 by the frame 11 brings about a stabile guide of the frame 11 against tipping and rotary motion simultaneously with easy adjustability. The guide created, thereby, for the mark 12 is free of play and does not require any attendance. A vertical groove 13 is provided in one of the outer faces of the frame 11, and the flattened end 14 of a threaded spindle 15 is received non-rotatably in the vertical groove 13. The threaded spindle 15 is received by a nut 16 which is formed integrally with a shaft projection 17. The nut 16 is rotatably mounted in the housing 1 by means of two ball-bearings 18 and 19, however, axially free of play by the provision of flat springs 20 which are disposed between the inner bearing ring of the ball-bearing 19 and a hand-rotary knob 21, which in turn is secured to the shaft extension 17 of the nut 16 by means of a set screw 22. A pressure spring 23 engages the opposite end of the frame 11, so that the frame 11 and the end 14 of the threaded spindle 15 are in a pressure lock connection.

If the nut 16 is turned manually by means of the hand-rotary knob 21, the spindle 15 is subjected to a movement in axial direction. Due to the pressure lock connection between the end 14 of the spindle 15 and the groove 13 of the frame 11, the latter and, thereby, the mark 12 move along the image plane 4. Small vertical movements of the frame 11 are permitted without any difficulty due to the possible relative vertical movement between the groove 13 and the end 14 of the spindle 15.

Accordingly, a predetermined rotary position of the nut 16 is coordinated to a predetermined of the mark 12 in the image plane 4. In order to limit the rotary movement of the nut 16 to less than a full revolution, an abutment pin 24 is provided on the hand-rotary knob 21, which abutment pin 24 engages a projection (not shown) of the housing 1.

A transparent disk 25 is rigidly connected with the nut 16, which disk 25 carries a series of numbers disposed concentrically to the axis of the spindle 15. During the rotation of the nut 16, these numbers pass by a second projection means which comprises a condenser 26, a mirror 27, an objective 28 and a second mirror 29, so that always one number of the series of numbers provided on the disk 25 is projected into the image plane 4 of the first projection ray path.

As shown in FIG. 3, this number, which happens to be by example 98, and is indicated by the numeral 30, is visible next to the image 31 of the object 3, so that the exact position of the object image 31 caught by the mark 12 can be read immediately in form of the number indicated by the numeral 30.

FIG. 4 shows a further improved embodiment of the guide for the carrier or frame 11. The spring blades 32, one of which is shown only, are bent to U or V-shape, so that the end secured to the housing 1 and that secured to the frame 11 are disposed in a common plane, which is parallel to the direction of adjustment movement 33. Due to this arrangement, the carrier or frame 11 moves exactly in a plane.

FIG. 5 shows schematically another embodiment of the adjustment drive for the mark carrier. The frame 111, which carries the mark in the same manner as in the previously described embodiment, has a plane engagement face 134 for the rounded end 135 of the threaded spindle 115, instead of an engagement groove for the flattened end of the spindle. On the other hand, the spindle 115 is received, in the same manner as the spindle 15 in the previously described embodiment, by a rotatable nut 16. The securing of the spindle 115 against rotation is now brought about by means according to which a lever arm 137, which is rigidly clamped by means of a clamping member 136 to the end 135 of the spindle 115, is pulled by a spring 138 continuously towards a guide rail 139, which is rigidly secured to the housing 1. This embodiment has the same advantages as the previously described embodiment, however, is still simpler in its manufacture. It permits also by proper shaping of the guide rail 139 even the compensation for small errors which could occur due to a not completely plane movement of the mark 12 in view of its guidance means.

While I have disclosed several embodiments of the present invention, it is to be understood that these embodiments are given by example only and not in a limiting sense, the scope of the present invention being determined by the objects and the claims.

I claim:
1. A projector comprising
a housing,
light diffusing means including an image plane disposed at one end of said housing,
means for projecting an image of an object onto said image plane,
frame means carrying an index mark disposed in said housing,
said index mark being positioned within the path of rays of said projection means and close to said image plane,
spring blade arms secured to said housing and to said index mark carrying means, respectively, and constituting the only supporting means for said index mark carrying means, and
means for adjustment of said index mark carrying frame means substantially within the plane of the latter.

2. The projector, as set forth in claim wherein said adjustment means comprises a threaded spindle non-rotatably but axially movably mounted in said housing and engaging said index mark carrying means, an axially immovable, rotatable nut complementary to and receiving said threaded spindle, so that said threaded spindle is moved axially upon turning of said nut, the rotary position of said nut is a function of the position of said index mark opposite said image plane.

3. The projector, as set forth in claim 2, which includes a transparent disc disposed concentrically to and rigidly secured to said nut, said transparent disc carries a series of annularly disposed consecutive numbers, and a second projection means for projecting successively one of said numbers onto said image plane upon rotation of said nut.

4. The projector, as set forth in claim 1, which includes an angular support secured to said housing and receiving one end of at least two of said spring blade arms and said index carrying means receiving the other end of said at least two spring blade arms, to form a bendable, but single unit.

5. The projector, as set forth in claim 1, which includes a threaded spindle non-rotatably disposed in said housing and a guide rail secured to said housing, said threaded spindle engaging said mark carrying means in the direction of adjustment of said mark and additionally said guide rail in the direction of rotation of said spindle, so that said guide rail prevents rotation of said threaded spindle at least in one direction of rotation.

References Cited in the file of this patent

UNITED STATES PATENTS

| | | |
|---|---|---|
| 2,094,623 | Stokey | Oct. 5, 1937 |
| 2,392,461 | Clifton et al. | Jan. 8, 1946 |
| 2,422,611 | Becker et al. | June 17, 1947 |
| 2,537,917 | Simmons | Jan. 9, 1951 |
| 2,625,742 | Rawlings | Jan. 20, 1953 |

OTHER REFERENCES

Germany, application 1,046,894, printed Dec. 18, 1958.